INVENTORS
CLAUDE L. ROBINSON
ROBERT H. LILLYBLAD
BY Caswell & Lagaard
ATTORNEYS

June 20, 1950  C. L. ROBINSON ET AL  2,512,503
ELECTRIC BREAD TOASTER

Filed Jan. 2, 1946  9 Sheets-Sheet 5

FIG. 5

INVENTORS
CLAUDE L. ROBINSON
ROBERT H. LILLYBLAD
BY Caswell & Lagaard
ATTORNEYS

June 20, 1950 C. L. ROBINSON ET AL 2,512,503
ELECTRIC BREAD TOASTER
Filed Jan. 2, 1946 9 Sheets-Sheet 6

FIG. 6

INVENTORS
CLAUDE L. ROBINSON
ROBERT H. LILLYBLAD
BY Caswell & Lagaard
ATTORNEYS

June 20, 1950     C. L. ROBINSON ET AL     2,512,503
ELECTRIC BREAD TOASTER Filed Jan. 2, 1946     9 Sheets-Sheet 7

FIG. 7

INVENTORS
CLAUDE L. ROBINSON
ROBERT H. LILLYBLAD
BY Caswell & Lagaard
ATTORNEYS

June 20, 1950 C. L. ROBINSON ET AL 2,512,503
ELECTRIC BREAD TOASTER
Filed Jan. 2, 1946 9 Sheets-Sheet 9

FIG. 11

INVENTORS
CLAUDE L. ROBINSON
ROBERT H. LILLYBLAD
BY Caswell & Lagaard
ATTORNEYS

Patented June 20, 1950

2,512,503

UNITED STATES PATENT OFFICE 2,512,503

ELECTRIC BREAD TOASTER

Claude L. Robinson and Robert H. Lillyblad, Grand Haven, Mich., assignors to Camfield Manufacturing Company, Grand Haven, Mich., a partnership Application January 2, 1946, Serial No. 638,681

15 Claims. (Cl. 99—391)

Our invention relates to electric bread toasters of the type in which the bread is supported on a bread rack which is depressed into a case by means of a finger piece when the toaster is brought into operation.

An object of the invention resides in providing a mechanism by means of which the toaster may be operated from either end of the same.

Another object of the invention resides in providing a toaster having dual operating finger pieces, one at each end of the toaster and each adapted upon proper movement to actuate the toaster.

A still further object of the invention resides in providing mechanism extending between the ends of the toaster for operatively connecting the operating mechanism at each end of the toaster with the bread rack.

A feature of the invention resides in utilizing one or more longitudinally extending shafts for procuring coordinated movement between the operating mechanism at the two ends of the toaster.

Another object of the invention resides in providing a toaster having at one end a timing mechanism adapted to be reset at the end of a toasting period and having at its other end means for resetting said timing mechanism.

A still further object of the invention resides in providing manually operable releasing means for releasing the toaster prior to termination of the toasting period and adapted to be actuated from either end of the toaster.

An object of the invention resides in providing a toaster having a case with a bread rack mounted within the case for movement toward and from the heating means and in further providing a shaft extending completely through the case and having linkage connected to the same and to the bread rack.

A feature of the invention resides in providing a resetting device including a finger piece movable in the same direction as the bread rack and in providing mechanism between the bread rack and finger piece whereby the finger piece moves a lesser amount than the bread rack.

Another object of the invention resides in providing a release for the bread rack movable with the finger piece and operable from either end of the toaster.

A still further object of the invention resides in providing the release with a longitudinally movable rod extending through the case and operable from either end to release the bread rack.

Other objects of the invention reside in the novel combination and arrangement of parts and in the details of construction hereinafter illustrated and/or described.

In the construction of the type of electric toaster in which the bread is supported on a bread rack adapted to be depressed to bring the bread into toasting position, an operating finger piece is employed which is located at one end of the toaster and is adapted to be lowered to actuate the toaster. Also a dummy finger piece is invariably provided at the other end of the toaster which is fixed relative to the toaster case. The operator, when wishing to actuate the toaster, frequently attempts to depress the stationary finger piece with no results. This means that the toaster probably has to be turned end for end or that depression of the proper finger piece becomes awkward and inconvenient. The present invention overcomes this disadvantage by providing mechanism by means of which the toaster may be operated by depression of either finger piece.

For the purpose of illustrating our invention, we have shown an electric toaster similar to that disclosed in the patent to Robert Sardeson, No. 2,365,909, for Food Cooking Device, issued December 26, 1944.

Figure 1:
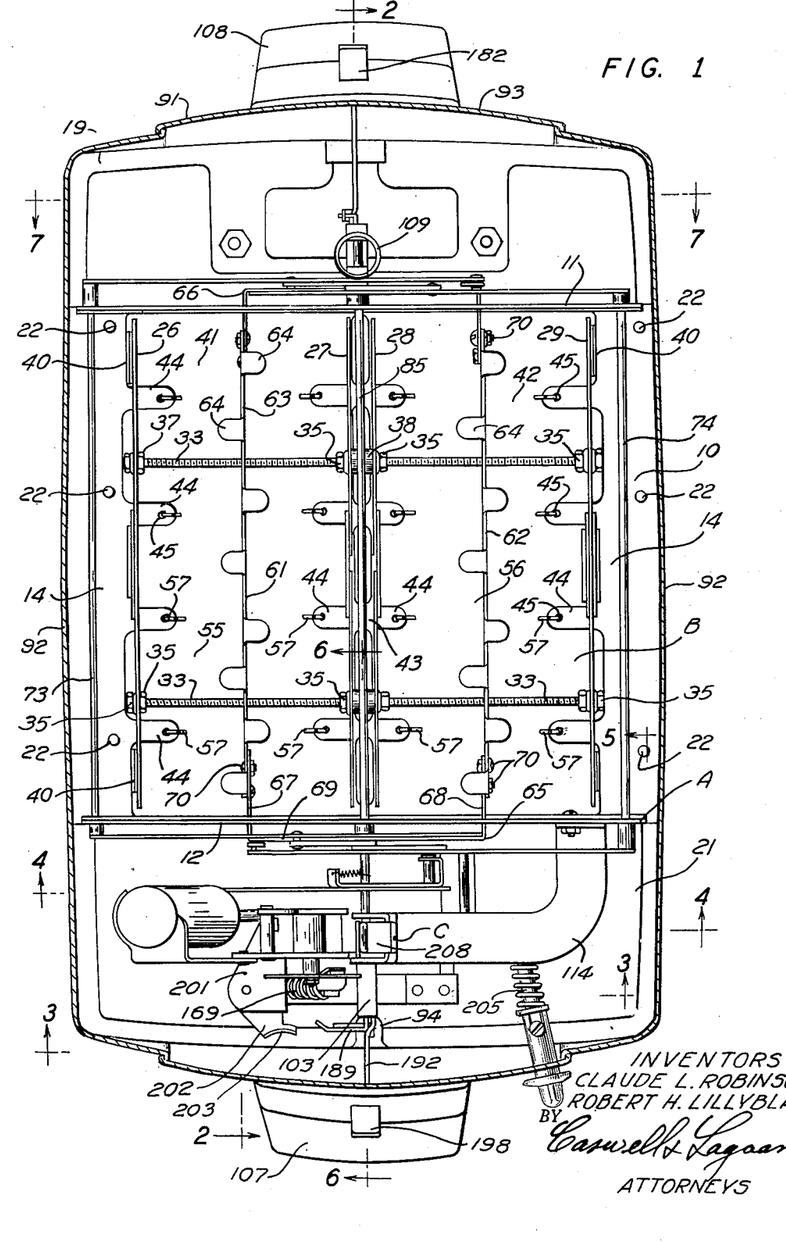
Fig. 1 is a plan sectional view of a bread toaster with the upper portion of the case thereof cut away and illustrating an embodiment of our invention.

The electric toaster illustrated comprises a frame A best shown in Fig. 1. This frame carries within itself a toaster B and at the outside portion of the same, a timing mechanism C for timing and controlling the operation of the toaster. These various parts will now be described in detail.

Figure 2:
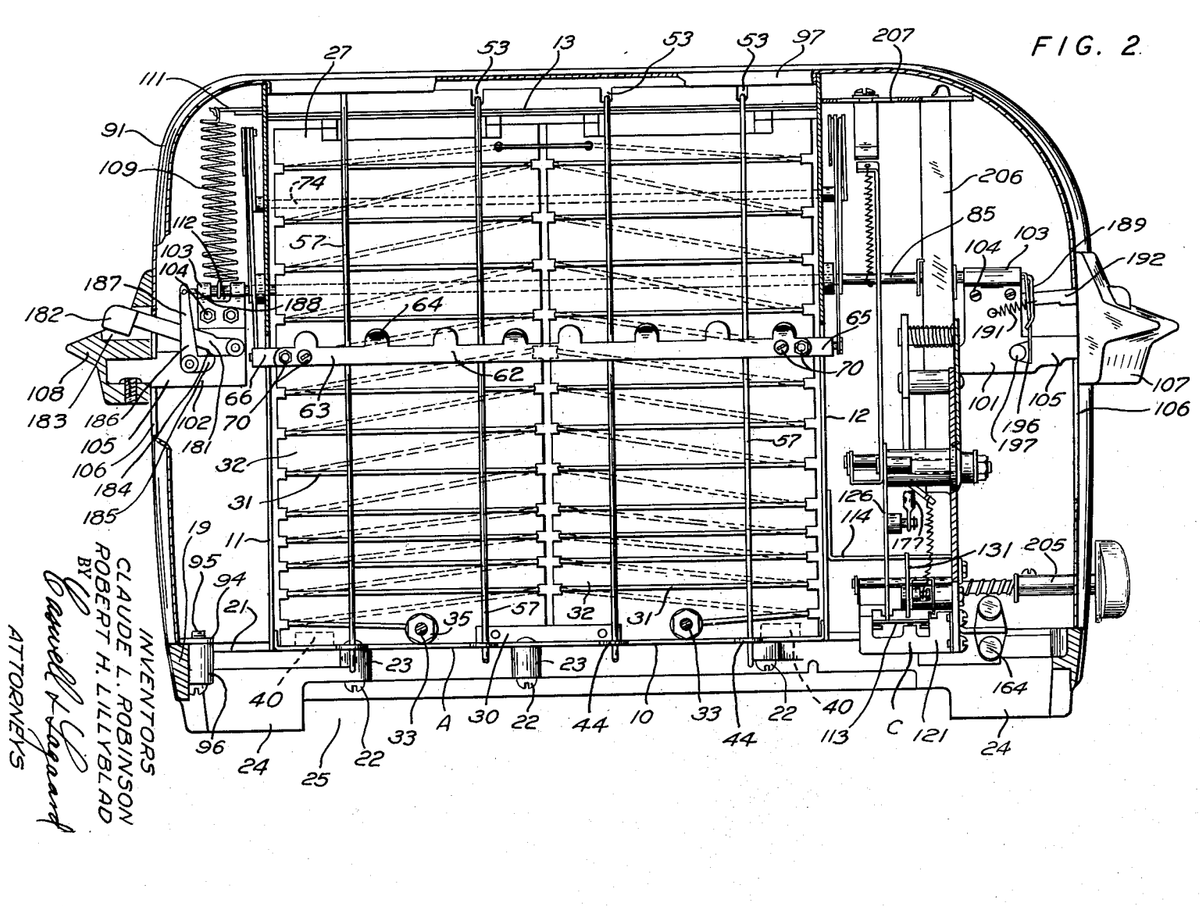
Fig. 2 is an elevational sectional view taken on line 2—2 of Fig. 1.

The frame A is best shown in Fig. 2 and consists of a lower horizontal frame member 10 constructed from sheet metal and two vertical end frame members 11 and 12 attached to the frame member 10. The frame further includes an upper horizontal frame member 13 which, together with the lower frame member 10, connects the frame members 11 and 12 together.

Figure 3:
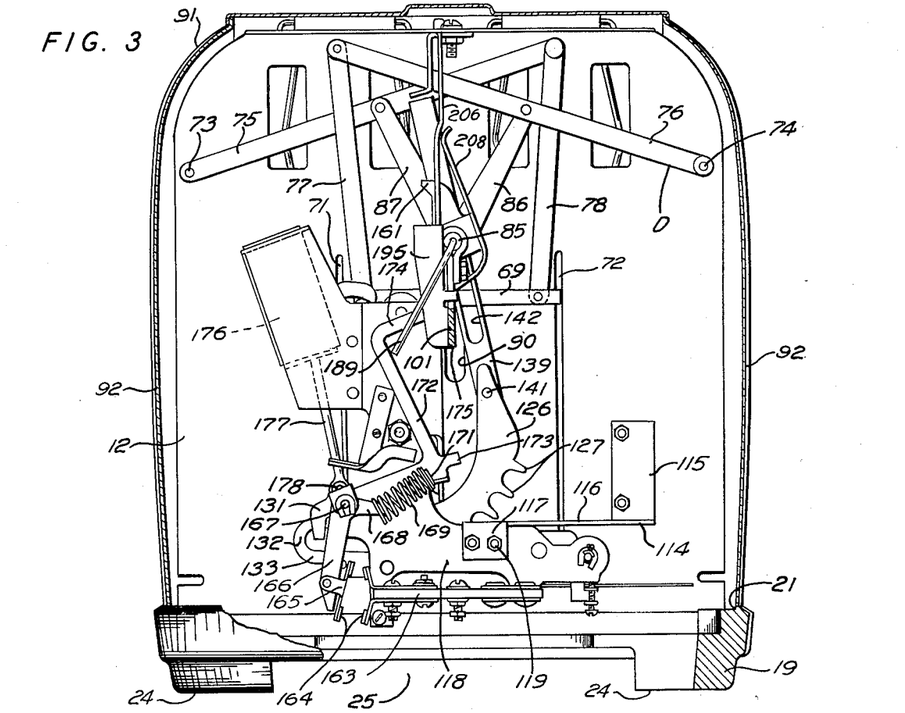
Fig. 3 is an elevational sectional view taken on line 3—3 of Fig. 1.
Figure 4:
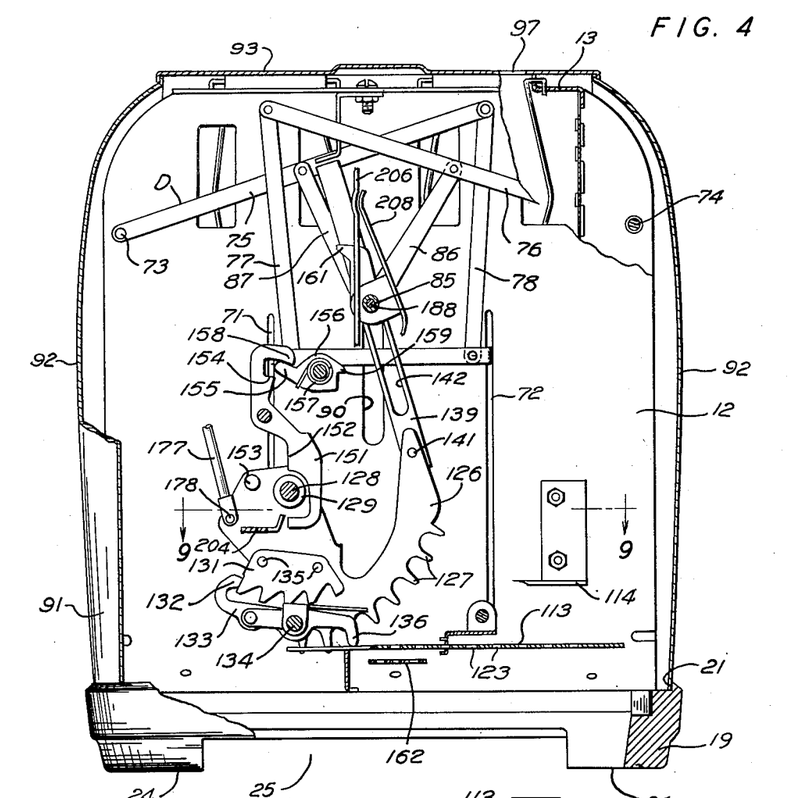
Fig. 4 is a view similar to Fig. 3 and taken on line 4—4 of Fig. 1.
Figure 5:
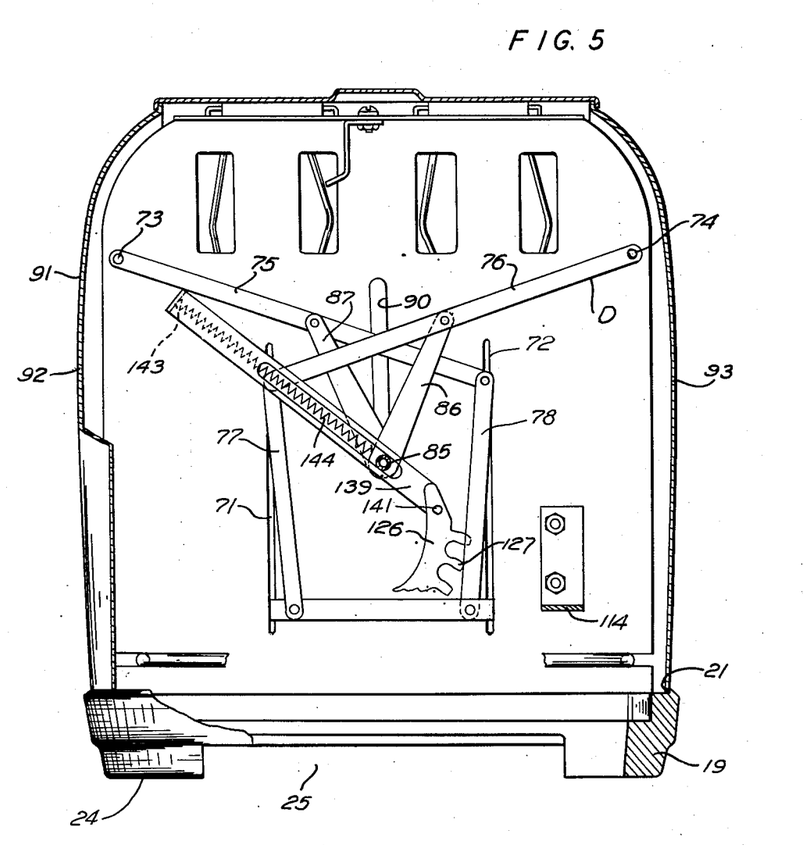
Fig. 5 is a view similar to Fig. 4 showing the parts in altered position.

The frame A is supported on a base 19, best shown in Figs. 1, 2 and 3 which is constructed from a suitable molded material and extends about the outer confines of the toaster, being open in the center. This base is constructed with a circumferentially extending rabbet 21 in which the marginal portions 14 of the lower frame member 10 of frame A rests. Said frame is held attached to the base 19 by means of screws 22 which are threaded into the marginal portions 14 of the lower frame member 10 and pass through ears 23 issuing inwardly from base 19. The base 19 is constructed with feet 24 which raise the base above the surface on which the toaster rests and provides spaces 25 therebetween for the admission of air into the toaster proper.

The toaster is enclosed by means of a case 91. This case has lateral walls 92 and an intervening wall structure 93 connected therewith, said case being open at the bottom. The lower ends of the said walls rest in a rabbet 21 formed in the said base. Issuing inwardly from the end walls of the said case are ears 94 which are threaded to receive screws 95. These screws pass through ears 96 formed on the base 19 which underlie the ears 94. The top of the structure 93 of this case is constructed with two longitudinally extending openings 97 which are directly disposed above bread ovens 55 and 56 and forming part of the toaster B.

Toaster B is constructed in the following manner: Disposed between the two end frame members 11 and 12 are four heating elements 26, 27, 28 and 29. Each of these heating elements is constructed from two sheets of heat resisting insulating material 32 on which are wound heating coils 31 constructed of resistance wire or ribbon. The two sheets of insulating material 32 of each heating element are connected together by means of a metallic connector 30 which overlies the same and is riveted thereto. The various heating elements 26, 27, 28 and 29 are secured together by means of threaded spindles 33 which are threaded to receive nuts 35. These spindles pass through the various sheets of insulating material 32 and the said sheets are supported thereon. By means of the nuts 35, the sheets are held in proper spaced relation. The heating elements 26, 27, 28 and 29 are further held in position upon the lower frame member 10 by means of lugs 40 which are struck up therefrom and which engage the outer heating elements 26 and 29. The frame member 10 of frame A is constructed with two longitudinal openings 41 and 42 which leave a center bar 43 and the marginal portions 14 of said base. These openings are so formed as to provide a number of lugs 44 which project inwardly from the edges of the portions 14 and the bar 43 of the frame 10. These lugs have holes 45 formed in the same. The upper frame member 13 is constructed similarly to the lower frame member 10 and supports the heating elements 26, 27, 28 and 29 in a manner to be presently described.

The four heating elements 26, 27, 28 and 29 form two bread ovens which are indicated in their entirety by the reference numerals 55 and 56. Bread is inserted into these ovens from the upper ends thereof and is held in position by a number of guard wires 57. These wires are supported from the upper and lower frame members 13 and 10. The lower ends of these guard wires extend through the openings 45 in lugs 44, while the upper ends thereof are received in notches 53 formed in the upper frame member 13 or held attached to said frame members in the same manner as disclosed in the patent above referred to.

Disposed within the two bread ovens 55 and 56 and movable between the sets of guard wires 57, are two bread racks 61 and 62. One of these bread racks is shown in detail in Fig. 2, and consists of a bar 63 of sheet metal which is constructed with lugs 64 projecting outwardly therefrom at the longitudinal edges thereof. For supporting the bread racks 61 and 62, two U-shaped supporting members 65 and 66 are employed which have legs 67 and 68 and cross-bars 69 connected thereto. The legs 67 and 68 extend through slots 71 and 72 in the end frame members 11 and 12 and are bolted to the bars 63 by means of bolts 70.

Figure 7:
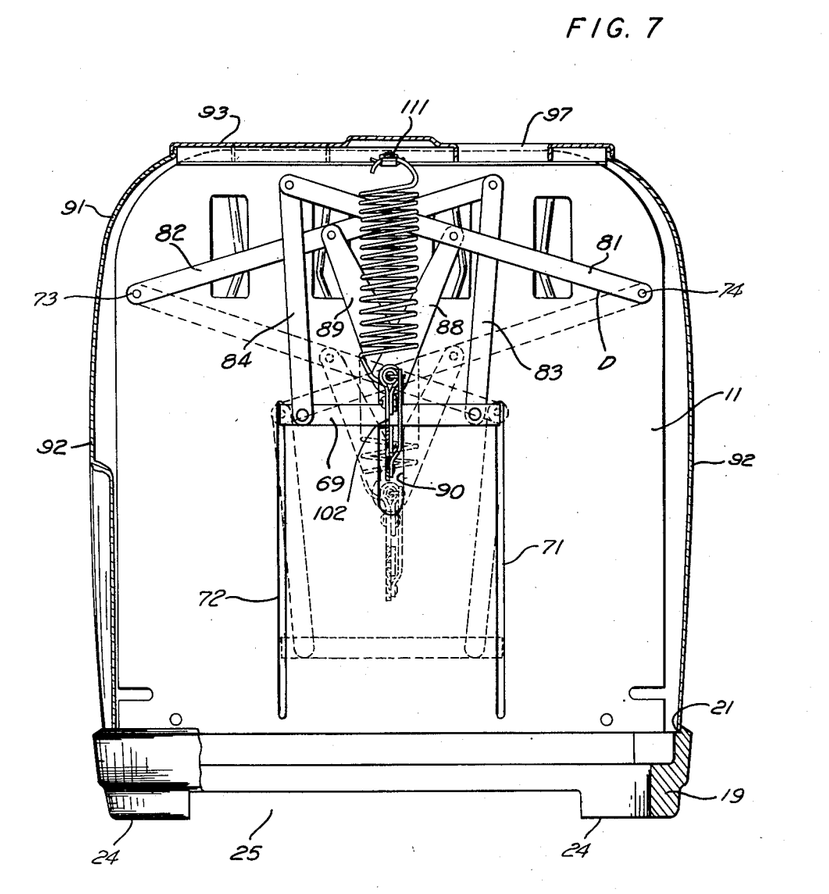
Fig. 7 is an elevational sectional view taken on line 7—7 of Fig. 1.

The cross-bars 69 of the said supporting members are disposed upon the exterior of the frame A and are connected to a linkage D best shown in Figs. 3 and 7. The linkage D includes two shafts 72 and 74 which extend through the two end frame members 11 and 12 and which are journaled for rotation therein. These shafts are disposed near the outermost edges of the said frame members and toward the top of the same. Adjacent the frame member 12, these shafts have attached to them arms 75 and 76 which are of such a length that the same cross each other and which lie in close proximity to the slots 71 and 72 in said end frame member. The ends of the said arms have pivoted to them links 77 and 78 which, in turn, are pivoted to the cross-bar 69 of the supporting member 65. At the opposite end of the frame A, as shown in Fig. 7, is utilized a mechanism similar to that employed for supporting the supporting member 65. Two arms 81 and 82 are attached to the opposite ends of shafts 73 and 74 and are closely positioned to the end frame member 11. These arms have pivoted to them depending links 83 and 84 which, in turn, are pivoted to the connecting portion 69 of the supporting member 66. By means of this construction, the two bread racks 61 and 62 are guided for simultaneous vertical parallel movement along the slots 71 and 72 in the two end frame members 11 and 12 and the two bread racks are at all times caused to remain horizontal throughout the vertical movement thereof.

For moving the two bread racks, a spindle 85 is employed which is tubular in form and which extends completely through the two end frame members 11 and 12 and is situated between the two heating elements 27 and 28. This spindle has pivoted to it at the end thereof adjacent frame member 12 two links 86 and 87 which, in turn, are pivoted to the two arms 75 and 76 intermediate the ends thereof. The said spindle has pivoted to it at its opposite ends two links 88 and 89 which are similarly pivoted to the arms 81 and 82 which overlie the frame member 11. The spindle 85 slides along two slots 90 in the two frame members 11 and 12. By means of the construction shown, the spindle 85 travels for a considerably shorter distance than the two bread racks 61 and 62 when the said bread racks are moved from one extreme position to the other.

For manually shifting the spindle 85, two brackets 101 and 102 are employed which are attached to the said spindle at the ends thereof. These brackets have looped portions 103 which are clamped in position upon the ends of said spindle by means of bolts 104. The brackets 101 and 102 have arms 105 extending outwardly therefrom and which project through and operate in slots 106 formed in the end portions of the wall structure 93 of case 91. By means of this construction, the brackets 101 and 102 are guided for vertical movement. The ends of said arms have attached to them finger pieces 107 and 108 and by means of which the said brackets may be depressed. A tension coil spring 109 is hooked at one end to a lug 111 which extends outwardly from the end frame member 11 and at its other end about a portion of the spindle 85 exposed by means of a slot 112 formed in the looped portion 103 of bracket 102. This spring urges the bread carriers 61 and 62 upwardly and into non-toasting position. Movement of the said carriage is terminated when the spindle 85 reaches the uppermost ends of the slots 90. It will be readily comprehended that depression of either of the finger pieces 107 and 108 will cause the bread racks to move downwardly into toasting position. Due to the arms and links connected to each end of the bread racks and to the shafts connecting the arms together, motion is transmitted to the bread racks without binding by operation of either or both of the two finger pieces 107 or 108.

Figure 8:
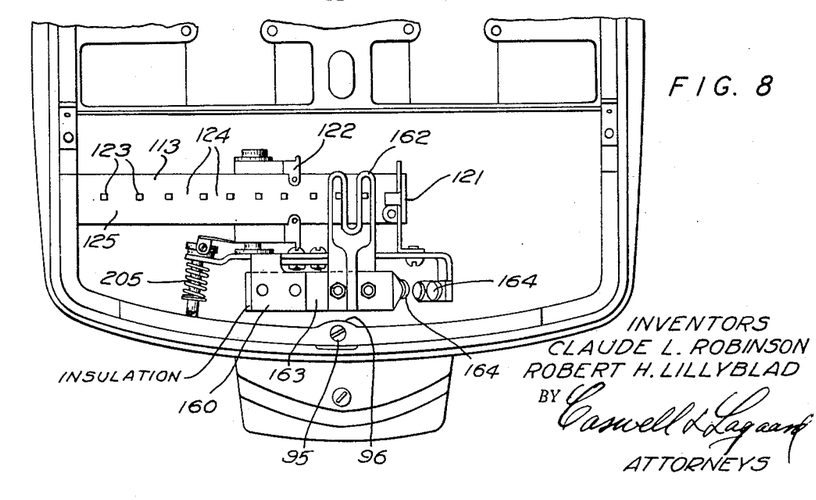
Fig. 8 is an inverted view of a portion of the structure shown in Fig. 1.

For timing the operation of the toaster, the timing mechanism C is employed. This timing mechanism is similar to that disclosed in the above noted Sardeson patent and consists of a strip of bi-metal 113, best shown in Fig. 8, which is movable in the direction of its length and is guided for movement in the following manner: Issuing outwardly from the end frame member 12 is a bracket 114 which includes a flange 115 bolted to said frame member and a shelf-like portion 116 extending outwardly therefrom. The extreme end of the shelf-like portion 116 has another flange 117 depending therefrom. The timing mechanism C includes a frame 118 which is constructed from a single sheet of material and which is bolted to the flange 117 by means of a bolt 119. The said frame has a bar 206 bent outwardly therefrom and which is secured at its upper end to extension 207 of the upper frame member 13 of the toaster frame A. This bar, in conjunction with the bracket 114, serves to rigidly support the frame 118 in position with reference to the frame A. Secured to the frame 118 are two guides 121 and 122 along which the said strip of bi-metal travels. The strip of bi-metal is constructed with a series of openings 123 arranged in spaced relation throughout the length thereof. These openings leave intervening portions 124 which form a rack indicated in its entirety by the reference numeral 125. Cooperating with the rack 125 is a segment of a pinion 126 which has teeth 127 adapted to mesh with the openings 123 of the rack 125. This pinion segment is attached to a shaft 128 which is journaled in a suitable bushing 129 attached to the frame 118. By means of this construction, the segment 126 rotates and the rack 125 moves lengthwise coincidentally. The pinion segment 126 has attached to it a small section 131 of a ratchet wheel which is adapted to engage a pawl 132 formed on a lever 133 pivoted at 134 to the frame 118. This latch section is spaced from the pinion 126 and is secured thereto in concentric relation with reference to the teeth 127 by means of rivets 135. The lever 133 is provided with a finger 136 which rides along the upper surface of the strip of bi-metal 113 and to one side of the row of openings 123 therein. When the bi-metal bows upwardly, the finger 136 is raised and the detent 132 is disengaged from the particular tooth of the ratchet 131 with which it was engaged to bring the next tooth in engagement with the detent. The segment 126 has pivoted to it at 141 an arm 139 which extends upwardly therefrom. This arm has a slot 142 in it through which the spindle 85 extends. The upper end of this arm has a lug 143 formed thereon and to which one end of a tension spring 144 is secured. The other end of this spring is hooked about the spindle 85. By means of this construction, rotation of the segment 126, in a clockwise direction, is procured.

Pivoted to the frame 118 is a latch lever 151. This latch lever has an abutment 152 which is adapted to be engaged by a lug 153 on the segment 126. The latch lever 151 has a shoulder 154 on it which is adapted to be engaged by a finger 155 formed on a catch lever 156. Catch lever 156 is also pivoted to frame 118. A helical coil spring 157, which engages the frame 118 and the lever 156, urges the lever into movement such that the finger 155 is adapted to engage a stop 158 on the latch lever 151. The catch lever 156 has a projection 159 which is adapted to be engaged by means of a catch 161 pivoted to the spindle 85. This catch has a leaf spring 208 attached to it which rides along the bar 206 and which normally urges the catch into engagement with the projection 159. When the carriage is lowered, catch 161 engages the projection 159 and holds the carriage in toasting position. The shoulder 154 on latch lever 151 prevents the catch lever 156 from turning. However, when the segment 126 reaches its final position, lug 153 engages abutment 152 and moves the shoulder 154 away from the finger 155. Spring 109 now causes the carriage to raise to its non-toasting position.

For operating the strip of bi-metal 113, a heater 162 is employed which is attached to a block 163 of insulating material. This block is secured to the frame 118 by means of a bracket 160 and to which the same is riveted. The block 163 of insulating material carries switch contacts 164 which are adapted to be closed by means of a switch jumper 165 mounted on a swinging lever 166. Lever 166 is pivoted on a stud 167 secured to frame 118. An arm 168 on lever 166 is connected by means of a compression coil spring 169 with a lug 171 formed on another lever 172. This lever is also pivoted on the stud 167 and has two fingers 173 and 174 projecting outwardly therefrom. Finger 173 is adapted to be engaged by a portion 175 of the bracket 101, while the finger 174 is adapted to be engaged by the spindle 85. By means of this construction, a snap action is provided between the lever 172 and the lever 166, thus rapidly opening and closing switch 164—165 when the bread racks are raised and lowered.

For the purpose of cushioning the action of the device, a dash pot 176 is employed which has a connecting rod 177 connected to a pin 178 secured to the segment 126.

Manual release of the bread racks is effected in the following manner: Pivoted to the bracket 102 is a lever 181 which extends through the slot 106 in the end portion of the wall structure 93 of the case 91. This lever has a button 182 on the end of the same which operates in a cavity 183 in the finger piece 108. The lever 181 has a cam 184 on it which engages an arm 185 formed on another lever 186 which is also pivoted to the bracket 105. Lever 186 has an arm 187 which is pivotally connected to a rod 188 disposed within the tubular spindle 85. The said rod is reciprocable within said spindle and at its opposite end, has an arm 189 extending outwardly therefrom. A tension coil spring 191 is attached at one end to the arm 189 and is attached at its other end to the bracket 101. This spring urges the rod 188 to the left, as viewed in Fig. 2, and also raises the lever 181.

Figure 6:
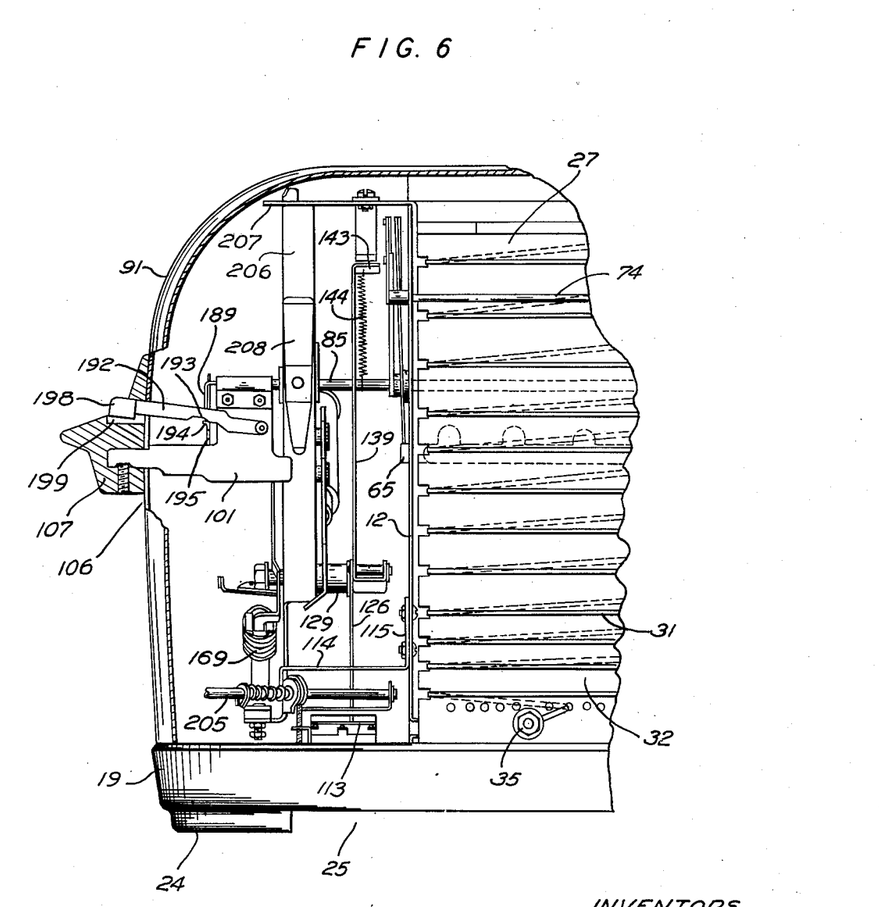
Fig. 6 is a fragmentary elevational sectional view taken on line 6—6 of Fig. 1.

For operating the rod 188 from the end on which the finger piece 107 is located, a lever 192, similar to the lever 181, is provided and which is pivoted to the bracket 101. This lever has a cam 193 which engages a lug 194 formed on a lever 195. Lever 195 has a flange 196 bent outwardly therefrom and is pivotally mounted on a pivot 197 secured to the bracket 101. The arm 189 on rod 188 overlies the lever 195 and is urged toward the left, as viewed in Fig. 2, by means of the arm 189 and the spring 191. When the lever 192 is depressed by means of a button 198 attached to the end of the same and operating within a cavity 199 in the finger piece 107, the cam 193 moves the lever 195 toward the left, as viewed in Fig. 6, and against the action of the spring 191.

Figure 9:
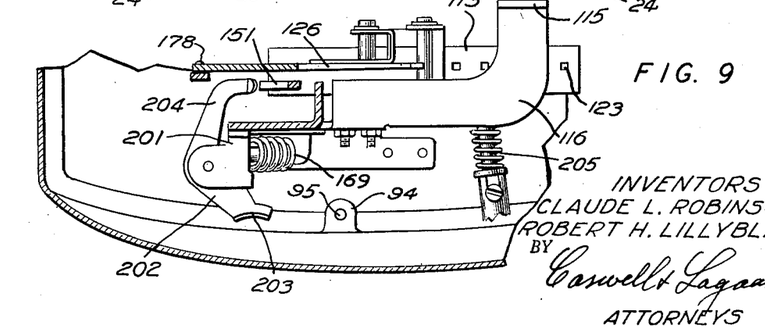
Fig. 9 is a fragmentary plan sectional view taken on line 9—9 of Fig. 4.

The two levers 181 and 192 operate to release the bread racks in the following manner: Extending outwardly from the frame 118 is a bracket 201. To this bracket is pivoted a lever 202. The lever 202 has an arm 203 which lies in the path of movement of the arm 189 formed on the end of rod 188. When the toaster parts are in toasting position, arm 189 lies opposite the arm 203 and movement of either of the levers 181 or 192 downwardly will cause the arm 189 to shift to the right, as viewed in Fig. 2 and the arm 203 of lever 202 to swing outwardly, as viewed in Fig. 9. This lever has another arm 204 which is adapted to engage the lowermost end of the latch lever 151 and to swing the same into unlatching position.

The degree of brownness of the toast may be controlled by an adjusting device 205 which cooperates with the strip of bimetal 113 to cause the same to be more rapidly or more slowly disengaged. Such construction forming no particular feature of the instant invention, has not been shown in details, and the Sardeson patent above referred to, is relied on for disclosure of the same.

The operation of the invention is as follows: In disuse, the break racks 61 and 62 occupy the position shown in Fig. 2, and the various parts associated therewith occupy the positions shown in Figs. 2, 3 and 7. While in such position, slices of bread are inserted into the two ovens 55 and 56 through the openings 97 in the case 91. Upon depressing either of the finger pieces 107 or 108, or both of them simultaneously, the bread racks 61 and 62 are lowered and brought into toasting position. As the bread racks are lowered, finger 173 on lever 172 is also lowered and the switch contacts 165 closed by means of the lever 166. At the same time, the heater 162 is energized and the strip of bi-metal moves toward the right, as viewed in Fig. 8, and toward the left, as viewed in Fig. 3, releasing the segment 126, one tooth at a time, as disclosed in the Sardeson patent above referred to. When the segment 126 reaches its extreme position, the lug 153 thereon engages the abutment 152 on said lever and moves the shoulder 154 out of engagement with the finger 155 on catch lever 156. This releases the catch 161 and the bread racks are brought up to normal position. The arm 139, sliding along the spindle 85, resets the segment 126. The toaster is now ready to be again operated. If, during the toaster operation, it becomes desirable to release the carriage, the same may be accompanied by depressing either of the levers 181 or 192 as previously described. This manually operates the latch lever 151 and frees the catch lever 156 to release catch 161 as described.

Figure 10:
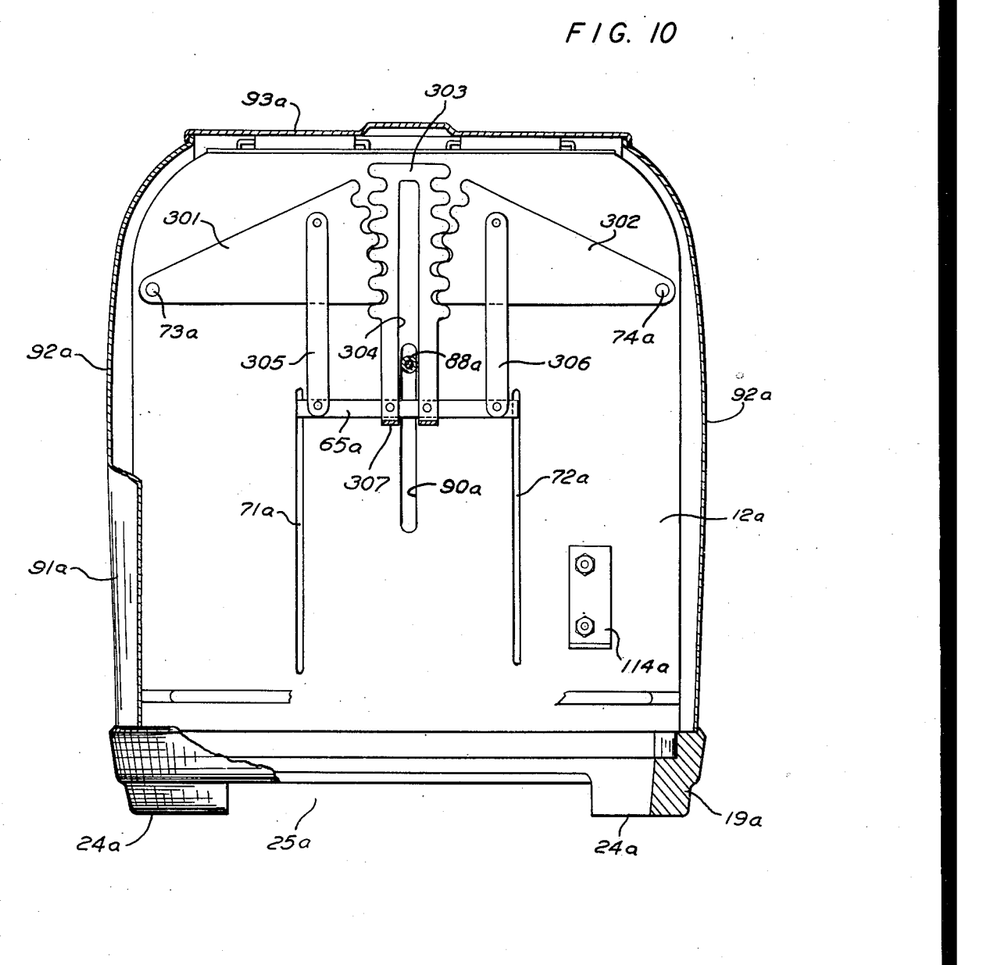
Fig. 10 is a view similar to Fig. 4 illustrating a modification of the invention.

In Fig. 10, we have shown a modification of the invention. In this form of the invention, the bread racks are supported in a somewhat different manner. However, the major portion of the toaster is identical with that previously described and the same reference numerals, followed by the suffix "a," will be used to describe corresponding parts. In this form of the invention, the two shafts 73a and 74a have attached to them at their ends gear segments 301 and 302. These segments mesh with a double rack 303 which has a slot 304 therein. A link 305, pivoted to the segment 301 and also to the supporting member 65a of the bread racks, supports the same at one side. A corresponding link 306, pivoted to the gear segment 302 and connected to the supporting member 65a, supports said carriage at its other side. The rack 303 has portions 307 which are bent outwardly therefrom and which are attached to the bracket secured on the tubular spindle 88a. This spindle slides along the slot 304 as the device is lowered. The operation of this form of the invention is the same as that disclosed in Figs. 1 to 9, and previously described.

Figure 11:
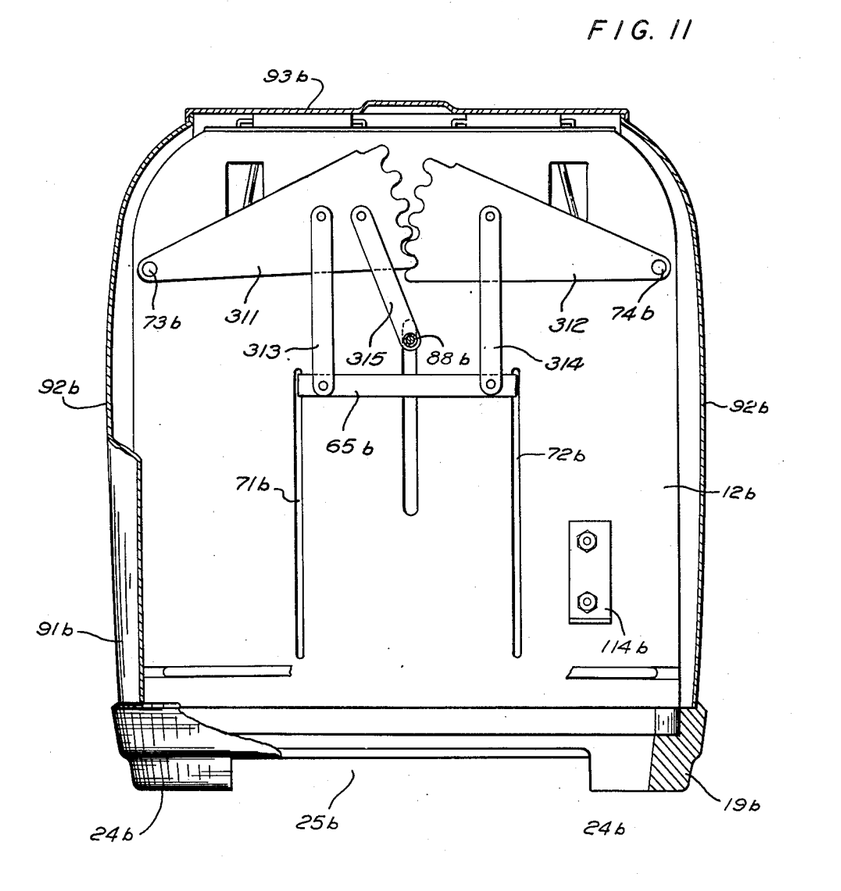
Fig. 11 is a view similar to Fig. 4 of still another form of the invention.

In Fig. 11, we have shown still another form of the invention in which the bread racks are supported in a manner similar to that shown in Fig. 10. In this figure, the parts similar to those previously described, will be referred to by the same reference numerals followed by the suffix "b." In this form of the invention, the two shafts 73b and 74b have attached to them at their ends gear segments 311 and 312 which, instead of meshing with a rack, as shown in Fig. 10, mesh directly with each other. A link 313 is pivoted to the gear segment 311 and also to the supporting member 65b. Similarly, a link 314 is pivoted to the gear segment 312 and also to said supporting member. The spindle 88b in this form of the invention is supported by means of a link 315 which is pivoted on said spindle and also pivoted to the gear segment 311. The operation of this form of the invention is the same as that of the form disclosed in Figs. 1 to 9 and previously described.

The advantages of our invention are manifest. A toaster is provided which can be equally as easily operated or released from either end. This saves the continual turning around of the toaster or the operation of the same from an awkward angle and eliminates the repeated pressing down of the fixed handle in an attempt to operate the toaster, as is the case with the ordinary toaster operable from one end only. The mechanism for operating the toaster is simple in construction and can be manufactured at a reasonable cost.

Changes in the specific form of our invention, as herein described, may be made within the scope of what is claimed without departing from the spirit of our invention.

Having described our invention, what we claim as new and desire to protect by Letters Patent is:

1. In a bread toaster, a frame, heating means within the frame providing two ovens, two bread racks, one within each oven movable simultaneously in an up and down direction toward and from the heating means, said bread racks having parts extending through said frame, cross bars connected to said parts for procuring simultaneous movement of said bread racks, two shafts extending through said frame on opposite sides thereof and having arms thereon extending above said cross bars, links between said arms and said cross-bars at opposite ends of said cross bars and causing corresponding movement of both ends of said bread racks, finger pieces at each end of said frame movable in an up and down direction and connecting means between said finger pieces and arms.

2. In a bread toaster, a frame, heating means within the frame providing two ovens, two bread racks, one within each oven movable simultaneously in an up and down direction toward and from the heating means, said bread racks having parts extending through said frame, cross bars connected to said parts for procuring simultaneous movement of said bread racks, two shafts extending through said frame on opposite sides thereof and having arms thereon extending above said cross bars, links between said arms and said cross-bars at opposite ends of said cross-bars and causing corresponding movement of both ends of said bread racks, finger pieces at each end of said frame movable in an up and down direction, supporting means for said finger pieces and links connecting said supporting means and arms for causing vertical movement of the bread racks upon corresponding movement of either of said finger pieces.

3. In a bread toaster, a frame, heating means within the frame providing two ovens, two bread racks, one within each oven movable simultaneously in an up and down direction toward and from the heating means, said bread racks having parts extending through said frame, cross-bars connected to said parts for procuring simultaneous movement of said bread racks, two shafts extending through said frame on opposite sides thereof and having arms thereon extending above said cross-bars, links between said arms and said cross-bars at opposite ends of said cross-bars and causing corresponding movement of both ends of said bread racks, finger pieces at each end of said frame movable in an up and down direction, supporting means for said finger pieces, links connecting said supporting means and arms for causing vertical movement of the bread racks upon corresponding movement of either of said finger pieces, said first named links being connected to said arms at distances outwardly from the shafts greater than the distances from the point of connection of the second named links to said arms to procure greater movement of said bread racks than said finger pieces.

4. In a bread toaster, a frame, heating means within the frame providing two ovens, two bread racks, one within each oven movable simultaneously in an up and down direction toward and from the heating means, said bread racks having parts extending through said frame, cross-bars connected to said parts for procuring simultaneous movement of said bread racks, two shafts extending through said frame on opposite sides thereof and having arms thereon extending above said cross-bars, said arms extending toward the furthermost ends of said cross-bars and crossing one another, links pivoted to said arms and to said cross-bars at the outermost localities thereof, finger pieces at each end of the frame movable in the same direction as said bread racks, supporting means for said finger pieces and links connected to said supporting means and to said arms at localities intermediate the end of said arms and said shafts.

5. In a bread toaster, a frame, heating means within the frame, a bread rack movable within said frame in a direction toward and from the heating means, a shaft extending through said frame from one end thereof to the other and disposed on one side of said bread rack, a second shaft extending through said frame and disposed on the other side of said bread rack, arms on said shafts extending toward one another, links connected to said arms and to said bread rack, finger pieces at each end of said frame and means for connecting said finger pieces with said arms.

6. In a bread toaster, a frame, heating means within the frame, a bread rack movable within said frame in a direction toward and from the heating means, a shaft extending through said frame from one end thereof to the other and disposed on one side of said bread rack, a second shaft extending through said frame and disposed on the other side of said bread rack, arms on said shafts extending toward one another, links connected to said arms and to said bread rack, finger pieces at each end of said frame, supporting means for said finger pieces and links connected to said supporting means and pivoted to said arms.

7. In a bread toaster, a frame, heating means within the frame, a bread rack movable in the frame in a direction toward and from the heating means, a spindle extending through said frame and movable relative thereto in the same direction as said bread rack, a shaft extending through said frame, and substantially parallel with said spindle, arms secured to said shaft, means for pivotally connecting said bread rack to said arms, means for pivotally connecting said spindle to said arms and finger pieces attached to the ends of said spindle.

8. In a bread toaster, a frame having end frame members, heating means within said frame, said end members having vertical slots therein, a bread rack movable in said frame in a direction toward and from the heating means, members on said bread rack and extending through said slots, a shaft extending through said end frame members and journaled therein, arms on said shaft, means for pivotally connecting said members of said rack to said arms, said end members having other slots therein parallel with said first named slots, an operating member parallel with said shaft and slidable along said second slots and means pivotally connected to said arms and to said operating member.

9. In a bread toaster, a frame having end frame members, heating means within said frame, said end members having vertical slots therein, a bread rack movable in said frame in a direction toward and from the heating means, members on said bread rack and extending through said slots, a shaft extending through said end frame members and journaled therein, arms on said shaft, means for pivotally connecting said members of said rack to said arms, said end members having other slots therein parallel with said first named slots, an operating member parallel with said shaft and slidable along said second slots and links pivoted to said arms and connected to said operating member.

10. In a bread toaster, a frame, heating means within the frame, a bread rack movable within said frame in a direction toward and from the heating means, a shaft extending through said frame from one end thereof to the other, a spindle extending through said frame from one end thereof to the other and disposed substantially parallel to said shaft, guide means for guiding said spindle for movement substantially in a direction parallel to the direction of movement of the bread rack, motion transmitting means acting between said shaft and spindle for procuring movement of said shaft upon movement of said spindle, motion transmitting means connected to said bread rack and to said shaft for moving said bread rack upon movement of said shaft, a finger piece secured to one end of said spindle, resilient means for urging said bread rack away from said heating means, a latch for holding said bread rack in toasting position and disposed at one end of said frame, an operating member extending through said frame and having a movement in a direction differing from that of said spindle, manipulating means at the end of said operating member opposite to said latch for moving said operating member in such direction and motion transmitting means at the other end of said operating member engaged by said operating member and transmitting motion to said latch for releasing said rack.

11. In a bread toaster, a frame, heating means within the frame, a bread rack movable within said frame in a direction toward and from the heating means, a shaft extending through said frame from one end thereof to the other, a spindle extending through said frame from one end thereof to the other and disposed substantially parallel to said shaft, guide means for guiding said spindle for movement substantially in a direction parallel to the direction of movement of the bread rack, motion transmitting means acting between said shaft and spindle for procuring movement of said shaft upon movement of said spindle, motion transmitting means connected to said bread rack and to said shaft for moving said bread rack upon movement of said shaft, a finger piece secured to one end of said spindle, resilient means for urging said bread rack away from said heating means, a latch for holding said bread rack in toasting position and disposed at one end of said frame, an operating member extending through said frame and having a movement in a direction differing from that of said spindle, said operating member being movable with said spindle, manipulating means at the end of said operating member opposite to said latch for moving said operating member in such direction, motion transmitting means at the other end of said operating member engaged by said operating member and transmitting motion to said latch for releasing said rack, said motion transmitting means being normally inoperative and becoming operative upon movement of the bread rack into toasting position.

12. In a bread toaster, a frame, heating means within the frame, a bread rack movable within said frame in a direction toward and from the heating means, a shaft extending through said frame from one end thereof to the other, a tubular spindle extending through said frame from one end thereof to the other and disposed substantially parallel to said shaft, guide means for guiding said spindle for movement substantially in a direction parallel to the direction of movement of the bread rack, motion transmitting means acting between said shaft and spindle for procuring movement of said shaft upon movement of said spindle, motion transmitting means connected to said bread rack and to said shaft for moving said bread rack upon movement of said shaft, a finger piece secured to one end of said spindle, resilient means for urging said bread rack away from said heating means, a latch for holding said bread rack in toasting position and disposed at one end of said frame, a rod extending through said spindle and slidable longitudinally relative thereto, motion transmitting means located at one end of said rod and actuated thereby, said motion transmitting means engaging said latch and transmitting motion thereto for releasing said rack and manipulating means at the other end of said rod.

13. In a bread toaster, a frame, heating means within said frame, a bread rack movable within the frame in a direction toward and from the heating means, resilient means for urging said bread rack in a direction away from said heating means, a latch for holding said bread rack in position adjacent said heating means, a manually controlled movable latch operating member extending through said frame from one end to the other, motion transmitting means at one end of said operating member engaged by said operating member and engaging said latch and upon movement of said operating member transmitting motion to said latch to move said latch into disengaging position, and manipulating means at the other end of said operating member engaging said operating member and upon actuation moving said operating member.

14. In a bread toaster, a frame, heating means within said frame, a bread rack movable within the frame in a direction toward and from the heating means, resilient means for urging said bread rack in a direction away from said heating means, a latch for holding said bread rack in position adjacent said heating means, a rod extending through said frame from one end to the other and guided for sliding movement in a longitudinal direction, motion transmitting means at one end of said rod engaged by said rod and engaging said latch and upon sliding movement of said rod in one direction transmitting motion to said latch to move said latch into disengaging position, and manipulating means at the other end of the rod engaging said rod and upon actuation sliding said rod.

15. In a bread toaster, a frame, heating means within the frame, a bread rack movable within said frame in a direction toward and from the heating means, resilient means acting between said rack and frame for urging said rack in a direction away from said heating means, a latch carried by said frame and restraining movement of said rack by said resilient means, a manually controlled operating member extending longitudinally of said frame, guide means for guiding said member for longitudinal movement and for movement in the direction of movement of said rack, a movable part at one end of said operating member moved by said operating member and adapted to engage a part movable with said latch when said rack is in position adjacent said heating means, said part when so disposed serving to operate said latch and release said rack, said part operating to become free from said latch when the rack is remotely positioned from said heating means, and manipulating means at the other end of said operating member.

CLAUDE L. ROBINSON.
ROBERT H. LILLYBLAD.

REFERENCES CITED

The following references are of record in the file of this patent:

UNITED STATES PATENTS

| Number | Name | Date |
|---|---|---|
| 1,669,501 | Van Deventer | May 15, 1928 |
| 2,031,330 | Padelford et al. | Feb. 18, 1936 |
| 2,052,927 | Hallwood | Sept. 1, 1936 |
| 2,106,824 | Bayne | Feb. 1, 1938 |
| 2,243,953 | Graham | June 3, 1941 |
| 2,260,043 | Middleton et al. | Oct. 21, 1941 |
| 2,288,748 | Scharf | July 7, 1942 |
| 2,370,404 | Huck | Feb. 27, 1945 |
| 2,389,927 | Parr | Nov. 27, 1945 |
| 2,414,325 | Newell | Jan. 14, 1947 |